W. J. RICHARDSON.
SELF LUBRICATING HUB FOR TROLLEY WHEELS.
APPLICATION FILED MAR. 28, 1910.
1,011,491.
Patented Dec. 12, 1911.
2 SHEETS—SHEET 1.
Fig. 1.
Fig. 2.
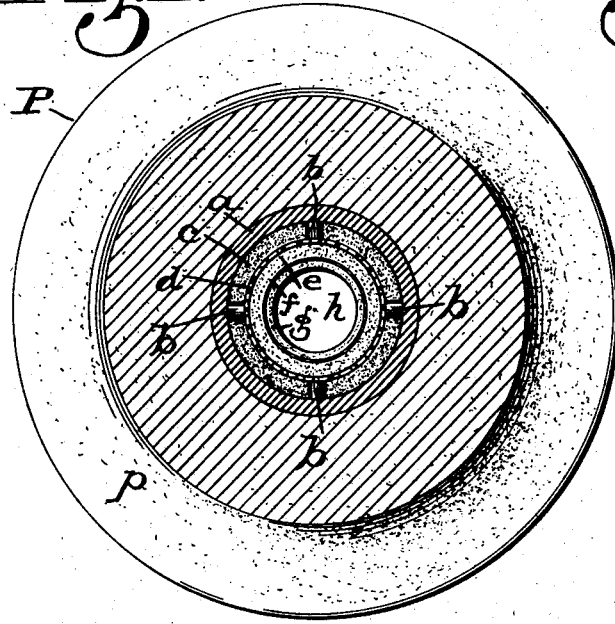
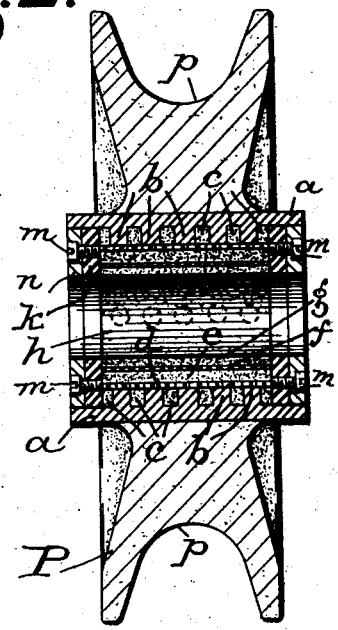
Fig. 3.
Fig. 4.
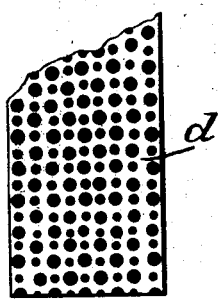
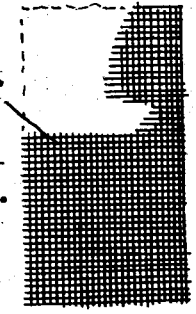
Fig. 5.
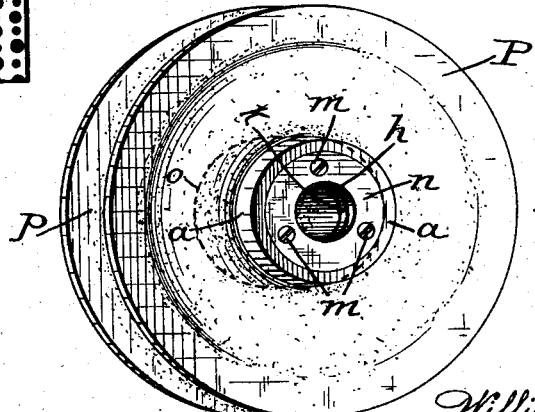
WITNESSES:
William L. Blocher.
David F. Detrick.
INVENTOR:
William J. Richardson,
BY Frank M. Burnham
ATTORNEY.

W. J. RICHARDSON.
SELF LUBRICATING HUB FOR TROLLEY WHEELS.
APPLICATION FILED MAR. 28, 1910.
1,011,491.
Patented Dec. 12, 1911.
2 SHEETS—SHEET 2.
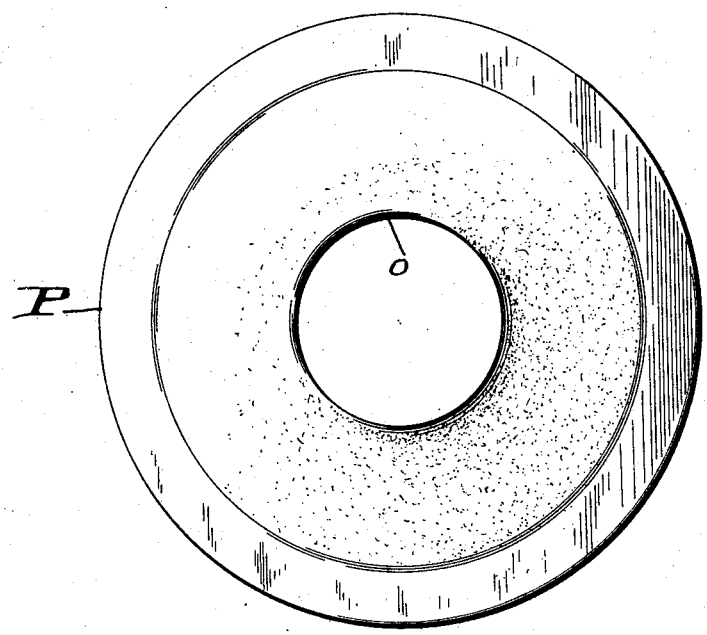
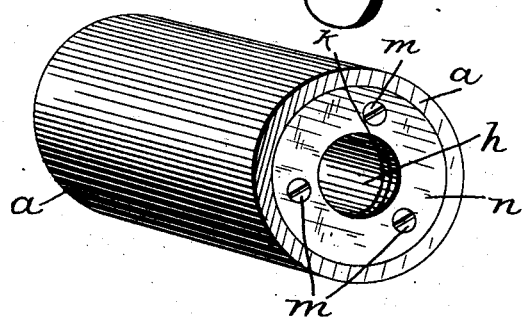
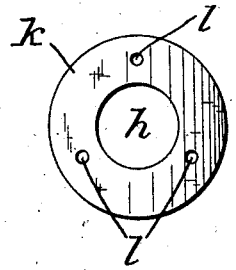
WITNESSES:
William L. Blocher.
David F. Detrick.
INVENTOR:
William J. Richardson,
BY Frank M. Burnham
ATTORNEY.
COLUMBIA PLANOGRAPH CO., WASHINGTON, D. C.

ID_ATES PATENT OFFICE.

WILLIAM J. RICHARDSON, OF DAYTON, OHIO.

SELF-LUBRICATING HUB FOR TROLLEY-WHEELS.

1,011,491. Specification of Letters Patent. Patented Dec. 12, 1911.

Application filed March 28, 1910. Serial No. 551,835.

*To all whom it may concern:*

Be it known that I, WILLIAM J. RICHARDSON, a citizen of the United States, residing at Dayton, in the county of Montgomery and State of Ohio, have invented certain new and useful Improvements in Self-Lubricating Hubs for Trolley-Wheels, of which the following is a specification.

My invention relates to a self-lubricating hub for trolley-wheels, or more specifically stated;—to a self-lubricating bushing or bearing for the spindle or axle of wheels;—shafts for operating machinery, and similar bodies for like purposes.

Some of the principal objects of this invention consists;—in providing a means for reducing to a minimum amount, the frictional contact of the hub forming the bushing or bearing, with its spindle or shaft, thus saving the great amount of wear and tear on same, thereby prolonging the life of said spindle or shaft as well as said hub, also facilitating the operation of the parts; also in providing an automatic lubricator for the spindle or axle of all classes or styles of wheels, and the bearing point of shafts; also in producing a device of this kind that is simple in construction, can be manufactured at a small cost and is therefore quite inexpensive.

Although my improved hub is more especially designed and intended for service on trolley-wheels,—in which connection it is herein illustrated, described and claimed,—it will become obvious that if so desired said hub may be employed with equal advantage on the spindle of all classes and styles of wheels, also as a bearing for various styles of shafting, thus serving as a self-acting lubricator or means for automatically lubricating the same.

This invention consists essentially,—referring briefly and in general terms to the formation of the device,—of the peculiar and novel construction, arrangement and combination of the various parts or mechanical elements, as will be hereinafter more fully and elaborately described in detail, and set forth in the subjoined claims all in accordance with the statutes in such cases made and provided therefor.

Referring to the accompanying drawings constituting a formal part of this specification, and illustrating one form of construction for carrying out the objects and principles of my invention, also of the application of the same, and wherein like letters of reference are utilized to indicate or point out like parts wherever occurring throughout the several views—Figure 1, is a section through the groove of a trolley-wheel showing a transverse sectional view of my self-lubricating hub in operative position; and Fig. 2, is a cross section through a trolley-wheel showing a longitudinal sectional-view of my self-lubricating hub in operative position. Fig. 3, is a view of a portion of the material out of which the perforated sleeve is formed. Fig. 4, is an illustration of a piece of the material out of which the gauze wire sleeve is formed. Fig. 5, is a perspective view of my trolley-wheel when completed and equipped with my self lubricating hub. Fig. 6, is a plan view of my trolley wheel partially completed and before the hub is forced in position. Fig. 7, is a perspective view of my self lubricating hub when completed; and Fig. 8, is a plan view of one of the inner disks.

In describing my said invention specifically, and referring in detail to the various mechanical parts, elements or features of construction, which in combination make up my self-lubricating hub for trolley-wheels by means of the characters of reference as aforesaid; $a$ refers to a hollow body or portion forming the hub, the interior of which is provided with lugs or projections $b$, which may be of any desired contour or shape, number and arrangement from that shown in Figs. 1 and 2, so as to leave suitable space forming chambers therebetween, in which are placed in compact form, graphite of a first class quality, or any solid lubricating material of a nature, suitable for the purpose intended,—which is indicated by the letter $c$;—said lubricating material coming flush with the ends of lugs $b$,—and against said lubricant and the ends of said supporting lugs, is forced a perforated sleeve $d$ of suitable thickness and preferably constructed out of metal,—the perforations being preferably large and small sized as shown in Fig. 3. A sleeve or collar $e$ composed of said lubricating material is then pressed within perforated sleeve $d$, and within collar $e$ is then placed a gauze-wire sleeve $f$, of fine mesh, and within said wire sleeve is pressed another sleeve or collar $g$, composed of said lubricating material; the whole being subjected to a heavy pressure leaving the parts of about the relative thicknesses shown in Figs. 1 and 2 and having a bore *h* adapted to the size of the spindle of the wheel or shaft of the machinery; and near each end of said hub is then forced until rigidly wedged an inner disk *k* provided with an opening forming a continuation of bore *h* and having screw-eyes *l* as shown in Fig. 8, adapted to receive counter-sunk screws *m*, by which the outer disks *n*—which close each end of said hub and come flush with same,—are held securely in position: outer disks *n* are also provided with an opening being a final continuation of bore *h*. Said hub now being completed, is then forced by a heavy and severe pressure into the opening *o*—see Fig. 6—of trolley-wheel P, adapted to receive it; until it is as rigidly and securely wedged and seated therein, as though it originally formed an integral part thereof. Said trolley-wheel in practice having its groove or sheave *p* of a proper depth and width just sufficient to securely retain the trolley-wire, and yet allow for it having the necessary play to shift in changing its position.

It will readily be understood, that in operation the continuous revolution of said hub with the wheel, will generate sufficient heat to affect said lubricating material, until it softens enough to pass in small quantities through the perforations of sleeve *d* and the meshes of gauze-wire sleeve *f* to bore *h*, where it coming in just the proper amount, in contact with the spindle or equivalent member, will automatically lubricate same; and when said wheel is not in operation and said hub therefore is not in action, said lubricant will cool down to its normal temperature.

Having now described my "self-lubricating hub for trolley-wheels," I claim:—

1. As an article of manufacture the herein described hub, consisting of an inclosing body having lugs extending therefrom and adapted to receive lubricant therearound, a perforated sleeve resting against said lugs and adapted to receive a lubricating collar, another sleeve of gauze wire material adapted to receive another lubricating collar, and disks at both ends and a central bore left throughout, all substantially as described.

2. The combination of a trolley-wheel formed with an opening; a hub forced rigidly within said opening and comprising a hollow-inclosing body having a portion of the length of its interior surface provided with short projections, the spaces between said projections adapted to be covered with lubricating material; a sheet metal sleeve having large and small perforations therein and extending the length of said projections and located within said body so as to rest against said projections; a sleeve of fine wire mesh the length of the first sleeve and so arranged within said inclosing body as to adapt it to have placed around each side thereof a sleeve of lubricating material, one of which rests against said sheet metal sleeve while the other lubricating sleeve forms the bore; and disks within said inclosing body at each end thereof and having central openings forming a continuation of said bore.

3. A hub for spindles and shafts comprising a hollow inclosing body; having a plurality of lugs extending radially and internally from said body and leaving spaces adapted for a filling of solid lubricant; a sheet metal sleeve having differential perforations therein arranged within said body so as to abut and rest against said lugs; another sleeve of gauze wire material so arranged within said inclosing body as to adapt it to receive collars of solid lubricating material one on each side thereof, one of which bears against said sheet metal sleeve while the other forms the bore; and a pair of disks firmly secured within said inclosing body at both ends thereof each provided with an opening which together complete the combination of said bore.

4. A wheel having a grooved periphery and a central portion transversely thereof the length of which is greater than the width of said periphery; said central portion comprising a hollow body having its interior surface provided with radially extending projections so arranged as to leave chambers therebetween adapted to receive anti-frictional material; a sheet metal sleeve having differential perforations therein and of less length than said body, and so located therein as to rest against said projections; a sleeve of wire fiber of less length than said body and so located therein as to receive a sleeve of lubricating material on each side thereof, one of which rests against said sheet metal sleeve while the other lubricating sleeve forms a bore; two disks firmly secured within said body at each end thereof, each disk provided with an opening constituting a continuation of said bore.

In testimony whereof I affix my signature in presence of two witnesses.

WILLIAM J. RICHARDSON.

Witnesses:
WILLIAM L. BLOCHER,
ALLEN C. MCDONALD.